United States Patent [19]

Kawabe et al.

[11] Patent Number: 4,869,754

[45] Date of Patent: Sep. 26, 1989

[54] ALUMINIUM PIGMENT COMPOSITION

[75] Inventors: Tetsufumi Kawabe, Yao; Toshiaki Bamba; Takashi Matsufuji, both of Yamato-Koriyama; Hiroaki Ueshimo, Omihachiman; Yoshiki Hashizume, Kawachi-Nagano; Eikichi Uchimura, Yamato-Koriyama; Masakatsu Harasda, Yao; Masahiro Aoki, Kyoto; Toru Kimura, Nara, all of Japan

[73] Assignee: Toyo Aluminium Kabushiki Kaisha, Osaka, Japan

[21] Appl. No.: 272,943

[22] Filed: Nov. 17, 1988

Related U.S. Application Data

[63] Continuation of Ser. No. 33,400, Apr. 1, 1987, abandoned.

[30] Foreign Application Priority Data

Apr. 4, 1986 [JP] Japan .................................. 61-77728

[51] Int. Cl.$^4$ ............................................... C09C 1/62
[52] U.S. Cl. ............................... 106/404; 106/287.17; 106/462
[58] Field of Search .................... 106/287.17, 404, 462

[56] References Cited

U.S. PATENT DOCUMENTS

| | | | |
|---|---|---|---|
| 2,858,230 | 10/1958 | Knoll et al. | 106/308 Q |
| 4,213,886 | 7/1980 | Turner | 106/308 Q |
| 4,350,535 | 9/1982 | Ishijima | 106/403 |
| 4,443,256 | 4/1984 | Huybrechts | 106/308 Q |
| 4,484,951 | 11/1984 | Uchimura et al. | 106/308 Q |
| 4,565,716 | 1/1986 | Williams, Jr. et al. | 106/308 Q |
| 4,621,112 | 11/1986 | Backhouse et al. | 106/308 Q |
| 4,675,358 | 6/1987 | Frangou | 524/439 |

*Primary Examiner*—A. Lionel Clingman
*Assistant Examiner*—Willie J. Thompson
*Attorney, Agent, or Firm*—John P. White

[57] ABSTRACT

An aluminium pigment composition disclosed herein comprises aluminium flakes, phosphorus supplied from an inorganic phosphoric acid in an amount of 500 to 10,000 ppm based on the aluminium weight, an aliphatic compound having at least one functional group within a molecule in an amount of 0.3 to 5 parts by weight per 100 parts by weight of aluminium, water in an amount of 0.05 to 10 parts by weight of aluminium, a water-compatible alcohol in an amount of 5 to 100 parts by weight per 100 parts by weight of aluminium and a hydrocarbon oil in an amount of 1 to 70 parts by weight of aluminium. The aluminium pigment composition according to the invention is particularly suitable for incorporating in the water base paint.

17 Claims, No Drawings

ALUMINIUM PIGMENT COMPOSITION

This is a continuation of application Ser. No. 033,400, filed Apr. 1, 1987, now abandoned.

FIELD OF THE INVENTION

The invention relates to an aluminium pigment composition. More particularly, the invention relates to the aluminium pigment composition suitable for incorporating in a water base paint such as a water-soluble paint, an aqueous emulsion paint and the like.

BACKGROUND OF THE INVENTION

Recently, water base paints have been extensively developed in many countries including Japan as the replacement of the organic solvent base paints for saving costs and resolving the environmental pollution problems. In this connection, the development of metallic pigments suitable for incorporating in the water base paints has been highly desired to use for top coating the automobiles and the other vehicles so as to give them the high grade appearances.

As the metallic pigment for incorporating in the water base paint, a pigment composition comprising aluminium flakes and a surfactant which is added for improving the water dispersibility has been known. However, this composition has the important defect of evolving a large volume of hydrogen gas during a long storage period, thereby an explosion may occur.

As the method for resolving the above-mentioned defect, the methods of forming anti-corrosive coatings on the aluminium flakes by adding an anti-corrosive material such as morpholine, dimeric acid, organic phosphate ester, boric acid salt and the like in addition to the surfactant have been proposed. However, these methods could not completely prevent the evolution of hydrogen gas. Further, the coatings formed on the aluminium flakes caused another defects of darkening the color tone characteristic of the metallic pigment as well as aggregating the flakes during the long storage period.

A method of contacting aluminium flakes with an aqueous solution containing available phosphate ions supplied from the phosphate compound such as $(NH_4)_2HPO_4$ and the like in an amount of at least 0.7 % by weight based on the aluminium weight and having pH of about 1.5 to 11 is disclosed in U.S. Pat. No. 2,858,230. A pigment composition obtained by the above-mentioned method can prevent considerably the evolution of hydrogen gas in the aqueous medium, but this composition cannot give the paint film with the satisfactory color tone. And, this composition tends to gradually darken the color tone with the evolution of the gas and to aggregate the flakes during the storage.

An object of the invention is to provide a pigment composition which can be incorporated in the water base paint without showing the above-mentioned defects.

An object of the invention is to provide an aluminium flake pigment composition which when incorporated in the water base paint, evolves a little volume of hydrogen gas and has a little tendency of darkening the color tone and aggregating the flakes during the long storage period.

SUMMARY OF THE INVENTION

The above-mentioned objects of the invention can be achieved by the pigment composition according to the invention which comprises aluminium flakes, a phosphorus supplied from an inorganic phosphoric acid in an amount of 500 to 10,000 ppm based on the aluminium weight, an aliphatic compound having at least one functional group within a molecule in an amount of 0.3 to 5 parts by weight per 100 parts by weight of aluminium, water in an amount of 0.05 to 10 parts by weight per 100 parts by weight of aluminium, a water-compatible alcohol in an amount of 5 to 100 parts by weight per 100 parts by weight of aluminium and a hydrocarbon oil in an amount of 1 to 70 parts by weight of 100 parts by weight of aluminium.

DETAILED DESCRIPTION OF THE INVENTION

The aluminium flakes usable in the invention are not particularly limited, but the aluminium flakes having surface properties, size and form suitable as the metallic flake pigment are preferable. Generally, the aluminium flakes obtained by the so-called Hall process wherein the aluminium powder is subjected to grinding in a hydrocarbon oil in the presence of a grinding agent in a ball mill are used.

The aluminium flakes in the pigment composition according to the invention have the thin and dense coatings containing phosphorus supplied from the inorganic phosphoric acid. The inorganic phosphoric acid usable in the invention may be at least one member selected from the group consisting of ortho-phosphoric acid, pyro-phosphoric acid, triphosphoric acid, tetra-phosphoric acid and phosphorous acid.

The phosphorus content in the coating should be 500 to 10,000 ppm based on the aluminium weight. Preferably, the phosphorus content is 1,000 to 7,000 ppm based on the aluminium weight. If the phosphorus content is less than 500 ppm the larger volume of hydrogen gas evolves, while if it is over 10,000 ppm the flakes may aggregate and the color tone may darken.

The aliphatic compound is used in the invention for preventing the aggregation of the flakes by adsorbing or binding it on the coating. Therefore, the aliphatic compound used in the invention should have at least one functional group within the molecule. The preferable functional group may be selected from the group consisting of:

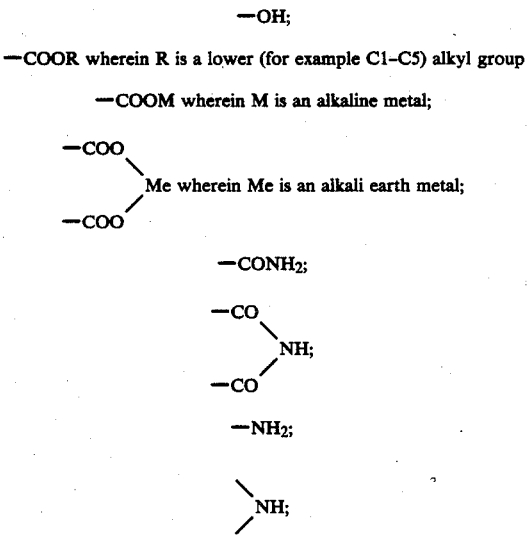

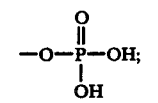

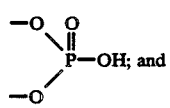

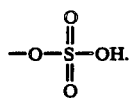

Further, it is preferable that the aliphatic compound has 8 to 40 carbon atoms. If the compound having 7 or less carbon atoms is used, the aggregation of the flakes may not be prevented as desired since the carbon chains in the pendant residues adsorbed or bound to the coating are too short. While, the compound having 41 or more carbon atoms is used, the handling is difficult since its molecular weight is too high. More preferably, the aliphatic compound having at least one of —$NH_2$ or >NH is used in the invention. The typical examples of such aliphatic amines may include 2-ethylhexylamine, caprylamine, decylamine, laurylamine, myristylamine, palmitylamine, stearylamine, oleylamine, eicosylamine, di-2-ethylhexylamine, dicaprylamine, didecylamine, dilaurylamine, dimyristylamine, dipalmitylamine, distearylamine, dioleylamine, dieicosylamine and the like. The examples of the other aliphatic compound usable in the invention may include an aliphatic higher alcohol such as lauryl alcohol and stearyl alcohol; an ester of aliphatic acid with lower alcohol such as methyl oleate and butyl stearate; a metal salt (Na, K, Mg, Ca or Zn salt) of aliphatic acid; an aliphatic acid amide such as oleic amide, stearic amide and dilauric amide; a mono- or diester of aliphatic alcohol with orthophosphoric acid such as mono- or dilauryl acid phosphate and mono- or distearylacid phosphate.

The content of the aliphatic compound in the pigment composition according to the invention should be 0.3 to 5 parts by weight per 100 parts by weight of aluminium. Preferably, the content of the aliphatic compound is 1 to 4 parts by weight per 100 parts by weight of aluminium. If the content is less than 0.3 part by weight it is difficult to prevent the aggregation of the flakes, while if it is over 5 parts by weight the color tone and the strength of the paint film may be adversely effected.

Water, the water-compatible alcohol and the hydrocarbon oil are essential in the invention for forming the thin and dense coating. The content of water in the pigment composition according to the invention should be 0.05 to 10 parts by weight per 100 parts by weight of aluminium. Preferably, the content of water is 0.1 to 5 parts by weight per 100 parts by weight of aluminium. If the content of water is out of the above range, the desired coatings cannot be formed on the flakes, whereby the evolution of hydrogen gas cannot be completely prevented as well as the problems of the aggregation and the change in color tone cannot be resolved.

The alcohol used in the invention should be compatible with water and hydrocarbon oil in a suitable ratio and completely dissolve te inorganic phosphoric acid. The typical examples of the water-compatible alcohol may include ethanol, propanol, isopropanol, butanol, isobutanol, amylalcohol, isoamylalcohol and a mixture thereof.

The content of the water-compatible alcohol in the pigment composition according to the invention should be 5 to 100 parts by weight per 100 parts by weight of aluminium. Preferably, the content of alcohol is 20 to 40 parts by weight per 100 parts by weight of aluminium. If the content is less than 5 parts by weight the desired coating cannot be formed, while if it is over 100 parts the pigment composition would be unstable.

As the hydrocarbon oil, the aliphatic or aromatic hydrocarbon oil such as mineral spirit, solvent naphtha, HAWS, LAWS and the like which are used in the grinding of the aluminium powder for obtaining the aluminium flakes can be used in the invention as it is.

The content of the hydrocarbon oil should be 1 to 70 parts by weight per 100 parts by weight of aluminium. Preferably, the content of the hydrocarbon oil is 30 to 50 parts by weight per 100 parts by weight of aluminium. If the content is less than 1 part by weight the pigment would be unstable, while if it is over 70 parts by weight the coating is formed very slowly.

The pigment composition according to the invention is desirable to include the surfactant for improving the water dispersibility of the aluminium flakes in the water base paint, depending on the kind of the paint. Among the known surfactant, the nonionic surfactant is preferable, such as polyoxyethylene alkylphenol ether, polyoxyethylene alkyl ether, polyethylene glycol fatty acid ester, sorbitan fatty acid ester and polyoxyethylene sorbitan fatty acid ester. The effective content of the surfactant is about 5 to 20 parts by weight per 100 parts by weight of aluminium. It is noted that the inclusion of the surfactant may be unnecessary depending on the kind of the water base paint.

The pigment composition according to the invention may include other known additives such as levelling agent, leafing stabilizer, thickener, inorganic or organic pigment and the like. The typical examples of the organic pigments include anthraquinones such as flavanthrone yellow, indanthrone blue, dibromeanthanthrone red and anthrapyridine yellow, indigos, pyranthrones, perylenes and the like. The typical examples of the inorganic pigments include phthalocyanine blue, titanium white and the like.

The pigment composition according to the invention is particularly suitable for incorporating in the water base paint. The water base paint in which the composition is incorporated is not particularly limited. For example, the pigment composition according to the invention is incorporated in the water-soluble paint or the aqueous emulsion paint which contains polyester, acryl, alkyd, acryl-urethane, CAB, polyvinyl alcohol, polyvinyl acetate or ethylene-vinyl acetate resin. Of course, the pigment composition according to the invention can be incorporated in inks, adhesives and the like.

EXAMPLES

The following examples illustrate the invention, but are not to be construed as limiting the scope thereof.

Percentages are by weight otherwise stated.

EXAMPLES 1 TO 14 AND COMPARATIVE EXAMPLES 1 TO 6

A cake with Al content of 80 % was prepared by removing a solvent from an aluminium paste pigment. The aluminium paste pigment used was a commercial available aluminium paste pigment (7160N, produced by TOYO ALUMINIUM K.K.) which essentially consists of aluminium flakes passing through 400 mesh screen (Tyler standard sieve) and mineral spirit and the Al content of which is 65 %. The thus-prepared cake contained an oleic acid used as a grinding agent in an amount of 1.5 parts by weight per 100 parts by weight of aluminium.

The cake was transferred into a mixer and the inorganic phosphoric acid, the aliphatic compound, the nonionic surfactant, water, the water-compatible alcohol and the hydrocarbon oil shown in Table 1 were added thereto and kneaded for three hours to obtain an aluminium pigment composition in a paste.

The phosphorus content and the water content in the thus-obtained composition were determined in accordance with the following methods. The results are also shown in Table 1.

(a) phosphorus content

Each sample was washed with a mixed solvent of water and isopropanol and a mixed solvent of ether and acetone, successively and then dried to remove the solvent. Then, the sample wa dissolved in an aqueous hydrochloric acid solution.

The phosphorus (P) content (ppm) based on the aluminium weight was determined by the plasma emission spectrophotometry.

(b) water content

The water in the sample was vaporized at 230° C. in $N_2$ gas flow and condensed.

The water content (parts by weight) per 100 parts by weight of aluminium was determined in accordance with Karl Fischer method by means of Moisture Meter VA-0.2 and CA-0.2 (produced by MITSUBISHI CHEMICAL INDUSTRIES LTD.).

EXAMPLE 15

The procedure of Example 10 was repeated to obtain a pigment composition with Al content of about 52 %, provided that the used cake contained stearic acid as the grinding agent in an amount of 1.7 parts by weight per 100 parts by weight of aluminium.

EXAMPLE 16

A pigment composition with Al content of about 52% was obtained in a similar manner to the procedure of Example 5. The used cake contained lauryl amine as the grinding agent in an amount of 1.0 part by weight per 100 parts by weight of aluminium.

EXAMPLE 17

The water dispersibility, the aggregation amount, the gas volume evolved in the water base paint and the change in color tone of the paint film of each pigment obtained in the above Examples and Comparative Examples were determined in accordance with the following methods. The results are shown in Table 2.

(a) water dispersibility

A predetermined amount of the sample was added to the pure water in the test tube. After stirring, the sample was allowed to stand.

Th dispersibility in water was observed with necked eyes and evaluated as follows:

◉ : disperse easily and homogeneously
◯ : disperse almost homogeneously
L : almost leafing (b) aggregation amount The sample after storing in a tank at 50° C. for one month was dispersed in water.

The weight of the sample not passing through 325 mesh screen (Tyler standard sieve) was determined and expressed as percentages based on the aluminium weight.

(c) gas volume

The water base paint used consisted of 21.3 g (calculated as aluminium) of the sample, 281.6 g of AL-MATEX WA-911 (produced by MITSUI TOATSU CHEMICALS, INC.), 44 g of CYMEL 350 (produced by MITSUI TOATSU CHEMICALS, INC.), 7.1 g of phthalocyanine blue, 14.4 g of triethyl amine, 34.6 g of isopropanol and 448.0 g of water. Eighty grams of the above paint was transferred into the glass bottle and stored at 50° C. for one month.

The total gas volume (ml) evolved during the storage was determined at the room temperature.

(d) change in color tone

The blue metallic paint film was formed by coating 150 microns in thickness of the above paint on the glass plate with a doctor blade and baking at 160° C. for 20 minutes. As the control, the blue metallic paint film was formed in a similar manner using the untreated pigment obtained in Comparative Example 1.

The color difference ($\Delta E$) of the paint film over the control paint film was determined by means of the color-difference meter with 45°-0° manner.

TABLE 1

| Example | inorganic phosphoric acid | P (ppm) | aliphatic compound | (parts)* | surfactant | (parts) | water (parts) | alcohol | (parts) | hydrocarbon oil | (parts) |
|---|---|---|---|---|---|---|---|---|---|---|---|
| 1 | ortho-phosphoric acid | 2200 | methyl oleate | 1.0 | POE alkylphenol ether | 7.5 | 1.21 | iso-propanol | 40 | mineral spirit | 40 |
| 2 | " | 2200 | oleic amide | 1.0 | " | 7.5 | 1.22 | " | 40 | " | 40 |
| 3 | " | 2200 | dilauric amide | 1.0 | " | 7.5 | 1.22 | " | 40 | " | 40 |
| 4 | " | 3700 | 2-ethylhexyl amine | 2.0 | polyethylene glycol fatty acid ester | 11 | 4.77 | " | 40 | " | 40 |
| 5 | " | 2400 | lauryl amine | 2.5 | POE alkylphenol ether | 7.5 | 1.18 | " | 40 | " | 40 |
| 6 | " | 530 | oleyl amine | 2.5 | POE alkyl ether | 11 | 0.05 | " | 40 | " | 40 |
| 7 | " | 1200 | dilauryl amine | 2.0 | POE alkylphenol | 7.5 | 1.08 | " | 40 | " | 40 |

TABLE 1-continued

| Example | inorganic phosphoric acid | P (ppm) | aliphatic compound | (parts)* | surfactant | (parts) | water (parts) | alcohol | (parts) | hydrocarbon oil | (parts) |
|---|---|---|---|---|---|---|---|---|---|---|---|
| 8 | " | 4700 | dioleyl amine | 1.5 | ether | 7.5 | 2.38 | " | 40 | " | 40 |
| 9 | " | 1100 | dioleyl amine | 2.5 | " | 7.5 | 1.04 | " | 40 | " | 40 |
| 10 | pyro-phosphoric acid | 2700 | stearyl acid phosphate | 2.5 | " | 7.5 | 3.30 | iso-butanol | 40 | mineral spririt solvent naphtha | 40 |
| 11 | ortho-phosphoric acid | 2200 | dilauryl acid phosphate | 3.0 | POE alkylphenol ether | 7.5 | 5.22 | iso-butanol | 50 | mineral spirit solvent naphtha | 40 |
| 12 | triphosphoric acid | 2300 | dioleyl acid phosphate | 4.0 | " | 7.5 | 8.13 | " | 30 | " | 40 |
| 13 | ortho-phosphoric acid pyro-phosphoric acid | 6800 | oleyl amine | 2.5 | " | 7.5 | 2.30 | " | 40 | " | 40 |
| 14 | pyro-phosphoric acid | 9000 | lauryl amine | 3.5 | " | 7.5 | 3.10 | " | 40 | " | 40 |
| 15 | " | 2700 | stearyl acid phosphate | 2.5 | " | 7.5 | 3.31 | " | 40 | " | 40 |
| 16 | ortho-phosphoric acid | 2300 | lauryl amine | 3.5 | " | 7.5 | 3.28 | " | 40 | " | 40 |
| Comp. Example 1 | no addition | — | no addition | — | " | 7.5 | 0.10 | no addition | 0 | mineral spirit | 90 |
| 2 | ortho phosphoric acid | 430 | stearyl amine | 2.0 | " | 7.5 | 1.03 | buthyl cellosolve | 40 | " | 40 |
| 3 | no addition | 450** | stearyl acid phosphate | 3.0 | " | 7.5 | 1.20 | " | 40 | " | 40 |
| 4 | ortho-phosphoric acid | 8600 | no addition | — | " | 7.5 | 20 | " | 20 | " | 40 |
| 5 | " | 2500 | lauryl amine | 3.0 | " | 7.5 | 20 | " | 20 | " | 40 |
| 6 | " | 12000 | " | 2.0 | " | 7.5 | 2.5 | " | 20 | " | 40 |

*parts is weight parts per 100 parts by weight of aluminium
**P supplied from the aliphatic compound

TABLE 2

| Examples & Comp. Examples | water dispersibility | aggregated amount (%) | gas volume (ml) | color difference (ΔE) |
|---|---|---|---|---|
| Ex. | | | | |
| 1 | ⊚ | 0.05 | not more than 1 | 0.5 |
| 2 | ⊚ | 0.05 | " | 0.5 |
| 3 | ⊚ | 0.05 | " | 0.5 |
| 4 | ⊚ | 0.03 | " | 0.4 |
| 5 | ⊚ | 0.02 | " | 0.4 |
| 6 | ⊚ | 0.02 | " | 0.4 |
| 7 | ⊚ | 0.02 | " | 0.3 |
| 8 | ⊚ | 0.03 | " | 0.4 |
| 9 | ⊚ | 0.03 | " | 0.5 |
| 10 | L | 0.03 | " | 0.6 |
| 11 | ⊚ | 0.03 | " | 0.5 |
| 12 | ⊚ | 0.03 | 2 | 0.6 |
| 13 | ⊚ | 0.03 | not more than 1 | 0.5 |
| 14 | ○ | 0.03 | " | 0.5 |
| 15 | L | 0.03 | " | 0.5 |
| 16 | ○ | 0.03 | " | 0.5 |
| Comp. Ex. | | | | |
| 1 | ⊚ | 0.02 | more than 50 | — |
| 2 | ⊚ | 0.02 | 48 | 0.3 |
| 3 | ○ | 0.6 | 5 | 2.5 |
| 4 | ○ | 5.5 | 2 | 12.5 |
| 5 | ⊚ | 7.3 | more than 50 | 9.4 |
| 6 | ⊚ | 1.5 | 2 | 2.0 |

EFFECT OF THE INVENTION

In the pigment composition according to the invention, the thin and dense coatings are formed on the surfaces of aluminium flakes. The coatings were covered with a large amount of long pendant residue of the aliphatic compound since the functional groups in the aliphatic compound adsorb or bind on the surfaces of aluminium flakes. Therefore, the pigment composition according to the invention has the improved water dispersibility as well as a little tendency to evolve a large volume of gas, aggregate the flakes and darken the color tone of the paint film.

We claim:
1. An aluminum pigment composition comprising aluminum flakes, a phosphorus supplied from an inorganic phosphoric acid in an amount of 500 to 10,000 ppm based on the aluminium weight, an aliphatic compound having at least one functional group within a molecule in an amount of 0.3 to 5 parts by weight per 100 parts by weight of aluminum, water in an amount of 0.05 to 10 parts by weight of aluminium, a lower alcohol consisting essentially of ethanol, propanol, isopropanol, butanol, isobutanol, amylalcohol, isoamyalcohol or mixtures thereof in an amount of 5 to 100 parts by weight per 100 parts by weight of aluminium and a hydrocarbon oil in an amount of 1 to 70 parts by weight of aluminium.

2. The composition of claim 1, wherein the aluminium flakes are those obtained by the Hall process.

3. The composition of claim 1, wherein the inorganic phosphoric compound is selected from the group consisting of ortho-phosphoric acid, pyro-phosphoric acid, triphosphoric acid, tetraphosphoric acid and phosphorus acid.

4. The composition of claim 1, wherein the phosphorus content is 1,000 to 7,000 ppm based on the aluminium weight.

5. The composition of claim 1, wherein the aliphatic compound has at least one functional group selected from the group consisting of:

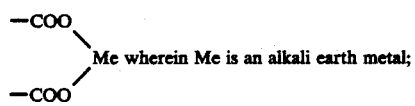

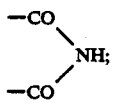

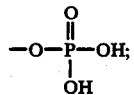

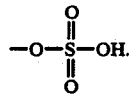

6. The composition of claim 5, wherein the aliphatic compound is an aliphatic amine, an aliphatic higher alcohol, an ester of an aliphatic acid with lower alcohol, a metal salt of an aliphatic acid, an aliphatic acid amide and a mono- or diester of an aliphatic alcohol with orthophosphoric acid.

7. The composition of claim 6, wherein the aliphatic compound is an aliphatic amine.

8. The composition of any one of claims 5 to 7, wherein the aliphatic compound has 8 to 40 carbon atoms.

9. The composition of claim 1, wherein the content of the aliphatic compound is a 1 to 4 parts by weight per 100 parts by weight of aluminium.

10. The composition of claim 1, wherein the content of water is 0.1 to 5 parts by weight per 100 parts by weight of aluminium.

11. The composition of claim 1, wherein the content of the lower alcohol is 20 to 40 parts by weight per 100 parts by weight of aluminium.

12. The composition of claim 1, wherein the hydrocarbon oil is an aliphatic hydrocarbon oil or an aromatic hydrocarbon oil.

13. The composition of claim 1, wherein the content of the hydrocarbon oil is 30 to 50 parts by weight.

14. The composition of claim 1, which further comprises a surfactant.

15. The composition of claim 14, wherein the surfactant is a nonionic surfactant.

16. The composition of claim 1, which is incorporated in a water base paint.

17. A water base pain comprising an aluminium pigment composition of any one of claims 1-16.

* * * * *

UNITED STATES PATENT AND TRADEMARK OFFICE
CERTIFICATE OF CORRECTION

PATENT NO. : 4,869,754

DATED : September 26, 1989

INVENTOR(S) : Tetsufumi Kawabe et al.

It is certified that error appears in the above-identified patent and that said Letters Patent is hereby corrected as shown below:

On the title page, "Masakatsu Harasda" should read --Masakatsu Harada--.

Signed and Sealed this

Tenth Day of November, 1992

Attest:

DOUGLAS B. COMER

*Attesting Officer*  *Acting Commissioner of Patents and Trademarks*